United States Patent [19]
Carter

[11] Patent Number: 5,243,781
[45] Date of Patent: Sep. 14, 1993

[54] FLY TRAP AND A BAIT THEREFORE

[76] Inventor: Danny B. Carter, 5244 Choctaw Ave., Pensacola, Fla. 32507

[21] Appl. No.: 842,616

[22] Filed: Feb. 27, 1992

[51] Int. Cl.[5] .............................................. A01M 1/02
[52] U.S. Cl. ....................................... 43/122; 426/1
[58] Field of Search .................... 43/107, 122; 426/1

[56] References Cited

U.S. PATENT DOCUMENTS

| | | | |
|---|---|---|---|
| 722,143 | 3/1903 | Raymond | 43/122 |
| 882,306 | 3/1908 | Fredrickson | 43/122 |
| 1,107,091 | 8/1914 | Mielke | 43/122 |
| 1,221,098 | 4/1917 | Shackelford | 43/122 |
| 1,497,800 | 6/1924 | Smith | 43/122 |
| 1,554,124 | 9/1925 | Ongstad | 43/122 |
| 1,715,958 | 6/1929 | Strand | 43/122 |
| 1,924,379 | 8/1933 | Reese | 43/122 |
| 4,244,135 | 1/1981 | Harwoods | 43/122 |
| 4,551,941 | 11/1985 | Schneidmiller | 43/122 |

Primary Examiner—Kurt C. Rowan
Attorney, Agent, or Firm—Keaty & Keaty

[57] ABSTRACT

A fly trap has a housing body with an entry conduit mounted within the housing body and supported therein. A lure holding tray is supported by the legs underneath the open bottom of the entry conduit and is adapted to receive a fly attractant mixture therein. The bait is formed from organic, non-toxic, non-hazardous material, which can be safely exposed to the environment for the purposes of attracting the flies into the fly trap.

27 Claims, 2 Drawing Sheets

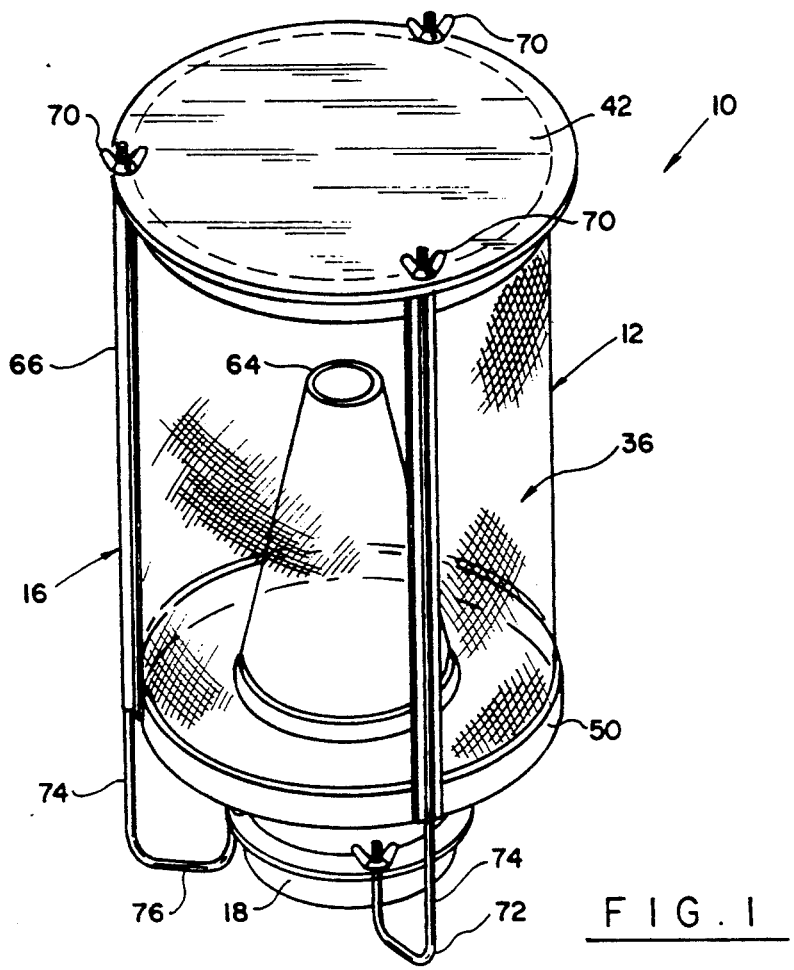
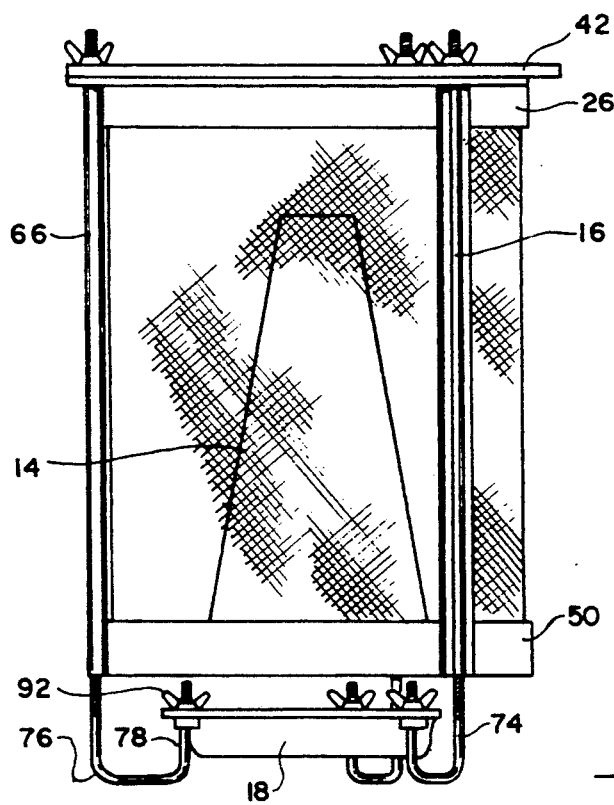

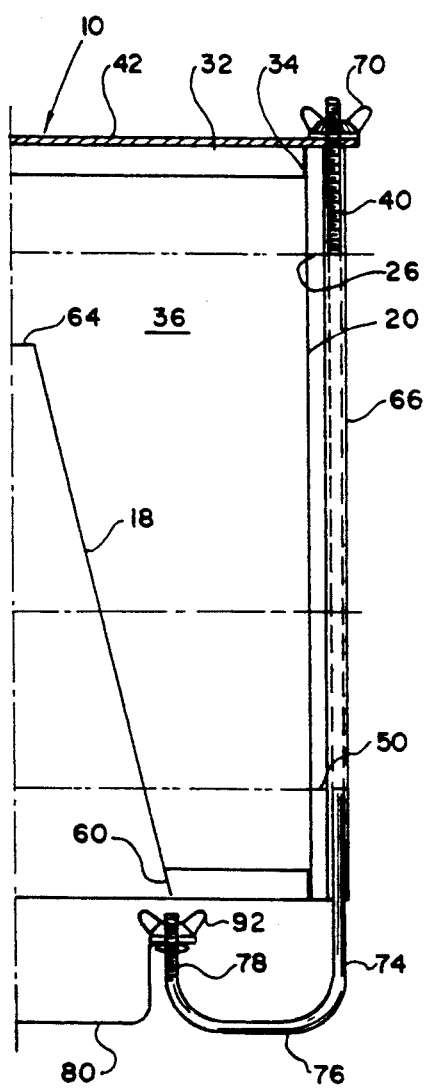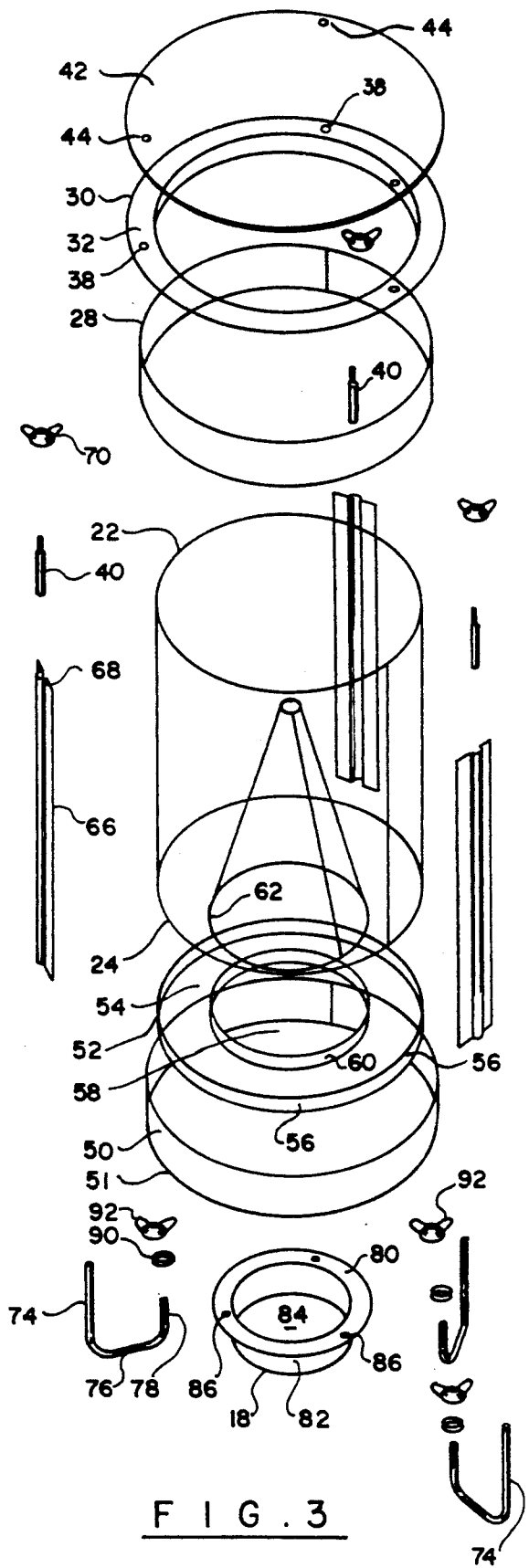
FIG. 4
FIG. 3

FLY TRAP AND A BAIT THEREFORE

BACKGROUND OF THE INVENTION

This invention relates to insect traps, and more particularly to a trap that is designed to trap flies and a lure therefor.

It has been long known that flies are not only annoying insects, but also harmful to humans, since they carry various and numerous pathogenic germs, while their larvae can cause intestinal problems. As a result, it is desirable to destroy flies not only in one's home but also in such commercial and public areas as food markets, restaurants, and the like.

Use of different devices have been proposed for attracting and destroying flies. Some of the known devices comprise a tape with adhesive coating which is suspended or laid flat on a surface, so as to cause the fly to land on the adhesive surface and adhere to it.

Other devices propose the use of fly traps which have containment chambers, wherein a liquified bait is deposited, and which attracts the flies to enter the chamber, wherein they will drown in an aqueous bait.

Similarly, various researches have been made to formulate a lure for attracting the flies. But such lures often contain pesticides which are unsafe for humans and domestic animals.

The present invention contemplates provision of a fly trap and a lure therefor which are safe for the environment and contain no toxic substances.

SUMMARY OF THE INVENTION

It is therefore an object of the present invention to provide a fly trap for controlling disease carrying insects.

It is further object of the present invention to provide a fly trap that is simple to use and inexpensive to manufacture.

It is a further object of the present invention to provide a lure to be used with a fly trap for attracting flies.

It is still a further object of the present invention to provide a fly trap and lure which is non-toxic and environmentally safe.

These and other objects of the present invention are achieved through a provision of a fly trap, comprising a housing means formed from an open mesh material and defining an interior chamber adapted to receive and retain entrapped flies. A frustoconically-shaped entry conduit is mounted within the housing in co-axial relationship thereto and has an open bottom which communicates with exterior of the housing and an open top which communicates with the interior chamber. A plurality of J-shaped leg support means support the housing, as well as a fly bait holding tray which is secured underneath the housing, above a reference horizontal surface.

A dry bait mixture which comprises the following ingredients expressed in a relative percentage by total weight: from about 4% to about 6% of calcium phosphate, between 13% and 17% of bicarbonate of soda, between 9% and 11% of dried bananas, from 60% to 40% of urea, from 4% to 6% of dried animal blood, from 0.25 to 1% of yeast, from 6% to 8% of fish meal, from 1% to 3% of potassium, from 1% to 3% of nitrates, from 0.5% to 1.5% of dried apples, from 0.5% to 1.5% of dried orange rind, and from 0.75% to 2% of dried mushrooms. The nitrate can be sodium nitrate or an organic nitrate, as desired. The mixture is non-toxic, contains no pesticides and, when mixed with a small amount of water to form a viscous composition, exudes a strong attractant odor to attract flies in a predetermined control area.

After consuming a small amount of the bait, the flies fly upwardly through the entry conduit and are entrapped within the interior chamber of the housing.

BRIEF DESCRIPTION OF THE DRAWINGS

Reference will now be made to the drawings, wherein like parts are designated by like numerals, and wherein FIG. 1 is a perspective view of the fly trap in accordance with the present invention.

FIG. 2 is a side view of the fly trap in accordance with the present invention.

FIG. 3 is an exploded view of the fly trap; and

FIG. 4 is partial longitudinal section view of a half of the device of the present invention, with the second half being a mirror image of that shown in FIG. 4.

DETAILED DESCRIPTION OF THE PREFERRED EMBODIMENT

Referring now to the drawings in more detail, numeral 10 designates the fly trap in accordance with the present invention. The device 10 comprises a containment housing 12, an entry conduit 14 mounted within the containment housing, a plurality of leg support means 16 and a lure holding tray 18.

The containment housing 12 comprises a cylindrically shaped mesh screen 20 having an upper ridge 22 and a lower ridge 24. Mounted in a circumferential relationship about the upper portion of the screen 20 is an upper support 26 which encircles the outer circumference of the screen 20 and is mounted in such a manner as to have its upper ridge 28 extend at substantially the same vertical level as the upper ridge 22 of the screen 20.

Mounted within the screen 20 and frictionally engaging the interior wall of the screen is an upper ring 30 which has a horizontal member 32 and a transverse member 34 fixedly attached and extending downwardly from the inner circumference of the ring 30. The outer diameter of the transverse portion 34 is slightly smaller than the interior diameter of the screen 20, allowing the transverse portion 34 to extend downwardly into the interior chamber 36 formed by the screen 20.

The horizontal member of the ring 30 is provided with three or more openings 38, each of which is adapted to receive a threaded stud 40 therethrough.

The housing 12 also provides for the use of a transparent cover 42 which is shaped as a circular plate of the diameter substantially equal to the diameter of the horizontal member 32, and greater than the outer diameter of the screen 20. Three or more equidistantly spaced openings 44 are formed in the cover 42, the openings 44 being spaced to co-align with corresponding openings 38 formed in the horizontal portion 32 of the ring 30. The openings 44, similar to the openings 38 allow passing of a securing stud 40 therethrough.

A lower portion of the screen 20 is enclosed within an annular support 50, which is shaped in the form of a ring similar to the support 26 and which has an interior diameter greater than the exterior diameter of the screen 20. Mounted within the interior portion of the screen 20 is a lower ring 52 which has a horizontal portion 54 and a transverse portion 56 extending at a right angle to the horizontal portion 54 and attached to the outer circumference of the ring 52.

The ring 52 has a central opening 58, which is surrounded by an inclined flange 60 fixedly secured to the edge of the horizontal portion 54 and defining the opening 58. The exterior diameter of the inclined flange 60 and the angle of the incline thereof corresponds to the exterior circumference of the lowermost portion 62 of the entry conduit 14. In this manner, the frustoconical entry conduit 14 frictionally engages, by its lowermost wider base, the inclined flange 60 and extends with its narrower apex 64 upwardly towards the upper portion of the housing 12.

Fixedly attached, such as by welding, to the upper and lower supports 26 and 50, respectively, are three or more support plates 66, each of which are formed with a U-shaped groove 68 in the center thereof. The support plates 66 extend a distance from the top edge 28 of the upper support 26 to the lowermost edge 51 of the lower support member 50.

Frictionally received within the upper portions of the grooves 68 are the non-threaded ends of the studs 40. The upper, threaded ends of the studs 40 extend through the apertures 38 and 44 of the upper ring member 30 and the cover 42, respectively, and are engaged with matching internally threaded wing nuts 70.

Frictionally engaged within the lower portion of each of the grooves 68 is a corresponding end of a J-shaped leg 72 which has a vertical portion 74, a transverse horizontal portion 76, and a second vertical portion 78. The uppermost end of the portion 78 is provided with external threads, as can be better seen in FIG. 3.

A lure holding tray 18 is formed in a shape of a shallow dish and has a horizontal outer rim 80, a continuous annular wall 82 and a bottom 84. The horizontal rim 80 is provided with three or more apertures 86 to allow passing of the leg portions 78 therethrough.

The vertical dimensions of the continuous wall 82 are smaller than the height of the leg portion 78, thus allowing to support the lure holding tray 18, in an elevated manner, while the horizontal leg portions 76 serve as supports for the fly trap 10.

The bottom surface of the rim 86 contacts a jam nut 90 which is internally threaded and is engageable with the external threads on the leg portions 78, while the upper surface of the rim 80 is frictionally engaged by a corresponding wing nut 92 which is similarly provided with internal threads matching the external threads on the leg portions 78. As a result, it is possible to suspend the lure holding dish 18 at different elevations along the vertical leg support portions 78.

The fly trap 10 of the present invention takes into consideration the natural tendency of domestic flies to fly directly upwardly after the food has been taken. Therefore, the lure holding dish 18 is aligned in such a manner, as to be immediately underneath an opening in the hollow frustoconical entry conduit 14 to allow the flies to move upwardly through the base of the conduit 14 to the open apex 64 and into the chamber 36 formed by the housing 12.

The lure holding tray 80 is adapted to receive a lure composition therein. The composition is non-toxic, contains no pesticides which may be harmful to humans or domestic animals and can be easily stored for a number of months in a dry condition. In the preferred embodiment, the lure composition comprises the following ingredients listed in percentage by total weight: from about 4% to about 6% of calcium phosphate, between 13% and 17% of bicarbonate of soda, between 9% and 11% of dried bananas, from 60% to 40% of urea, from 4% to 6% of dried animal blood, from 0.25 to 1% of yeast, from 6% to 8% of fish meal, from 1% to 3% of potassium, from 1% to 3% of nitrates, from 0.5% to 1.5% of dried apples, from 0.5% to 1.5% of dried orange rind, and from 0.75% to 2% of dried mushrooms.

The nitrate which can be utilized in the preferred embodiment of the present invention can be selected from a group containing sodium nitrate or an organic nitrate.

In the most preferred embodiment, the composition comprises a mixture of 5% by total weight of calcium phosphate, 15% by total weight of sodium bicarbonate, 10% by total weight of dried bananas, 50% by total weigh of urea, 5% by total weigh of dried animal blood, 0.5% of total weight of yeast, 7% by total weigh of fish meal, 2% by total weight of potassium, 2% by total weight of nitrate, 1% by total weight of dried apples, 1% by total weight of dried orange rind and 1.5% by total weight of dried mushrooms.

The dry mixture can be stored in an original package for an indefinite period of time and activated upon demand. When necessary, a package containing, for example, 6 ounces of the dry mixture is emptied into the lure holding tray 18 and is thoroughly mixed with a small amount of water sufficient to form a viscous substance. The yeast causes activation and release of the attractant odor, attracting the flies to the lure holding tray 18.

By using the natural tendency of flies to fly upward after consumption of a food, the device 10 causes the flies to be entrapped within the chamber 36. The mixture, if dried, can be reactivated by adding small amounts of water to keep the mixture in a relatively wet condition. The amount of dry mixture in the container, approximately 6 ounces, when tested, lasted between 3 to 6 weeks, depending on the amount of flies in the area and humidity of the environment. When tested, the device 10 has shown its effectiveness in controlling approximately a 2 acre fly infested area. The test also demonstrated that the trap was capable of catching and retaining approximately 20,000 flies per day.

In operation, the device 10 is positioned on a reference horizontal area, directly on the ground or on a pedestal at a distance of approximately 50 feet away from the fly infested area to be controlled. It is suggested that the device 10 be exposed to sunlight to better attract the flies. The wing nuts 70 are removed and the plastic cover 42 is lifted from its engagement with the studs 40 to allow access to the mesh housing 20. The housing 20 is lifted along with the ring 30 and the conduit entry 14. Thereby, the access to the lure holding tray 80 is achieved. A package of dry lure is emptied into the tray 80. The dry mixture is thoroughly mixed with a small amount of water to form a viscous substance. The housing 20 is replaced, followed by the cover 42, and secured with the help of wing nuts 70 in place. The device 10 is now ready for operation in controlling fly infestation.

The housing 20 of the present invention can be constructed from metal or plastic net mesh material, the cover 42 from a clear or translucent plastic, such as polycarbonate, with other elements of the device 10 being made of plastic or metal, as desired. The fly trap of the present invention can find utilization in such areas as farms, ranches, grocery stores, waste disposal plants, land fields, hospitals, nursing homes, camp grounds, parks, zoos, etc.

Many changes and modifications can be made within the design of the present invention without departing from the spirit thereof. I, therefore, pray that my rights to the present invention be limited only by the scope of the appended claims.

I claim:

1. A fly trap, comprising:
   a housing means defining an interior chamber adapted to receive and retain trapped flies;
   an entry conduit coaxially mounted within the housing means, said conduit having an open bottom which communicates with exterior of the housing and an open top which communicates with the interior chamber;
   leg support means supporting the housing at an elevated level about a reference horizontal surface;
   a lower holding means supported by the leg support means below the open bottom of the entry conduit;
   means for securing the housing to the leg support means, wherein said securing means comprises an upper horizontal annular member provided with a downwardly extending transverse flange, said transverse flange having an exterior surface which is securedly connected to an inner wall of an upper part of the housing means, said upper horizontal annular member extending outwardly and engaging the leg support means.

2. A fly trap, comprising:
   a housing means defining an interior chamber adapted to receive and retain entrapped flies;
   an entry conduit co-axially mounted within the housing means, said conduit having an open bottom which communicates with exterior of the housing and an open top which communicates with the interior chamber;
   leg support means supporting the housing at an elevated level from a reference horizontal surface;
   a lure holding means supported by the leg support means below the open bottom of the entry conduit; and
   wherein said leg support means comprises a plurality of elongated plates, each plate having a U-shaped groove formed in a central portion thereof and extending through substantially entire length of the plate, a plurality of generally J-shaped legs, each leg having a first vertical portion which is engaged in the groove of a corresponding plate, a horizontal middle portion which is adapted to rest on a horizontal surface, and a second vertical portion extending upwardly from the middle portion to a position under the housing means.

3. The device of claim 2, wherein said housing securing means is attached to the first vertical portion of the leg.

4. The device of claim 2, wherein said lower holding means is attached to the second vertical portion of the leg.

5. The device of claim 1, further comprising a cover means for closing an open top of the housing means, said cover means resting on the upper horizontal annular member.

6. The device of claim 2, wherein said leg support means further comprises an upper ring-shaped support member fixedly attached to an upper end of each of the elongated plates, and a lower ring-shaped support member fixedly attached to a lower end of each of the elongated plates.

7. A fly trap, comprising:
   a housing means defining an interior chamber adapted to receive and retain entrapped flies;
   an entry conduit co-axially mounted within the housing means, said conduit having an open bottom which communicates with exterior of the housing and an open top which communicates with the interior chamber;
   leg support means supporting the housing at an elevated level from a reference horizontal surface;
   a lure holding means supported by the leg support means below the open bottom of the entry conduit; and
   wherein said lure holding means receives a fly lure composition, comprising:
   a mixture of between 4% to 6% by total weight of calcium phosphate, between about 13% to 17% by total weight of sodium bicarbonate, between about 9% to 11% by total weight of dried bananas, between about 40% to 60% by total weight of urea, between about 4% to 6% by total weight by total weight of dried animal blood, between about 0.25% to 1% by total weight of dry yeast, between about 6% to 8% by total weight of fish meal, between about 1% to 3% by total weight of potassium, between about 1% to 3% by total weight of nitrate, between about 0.5% to 1.5% by total weight of dried orange rind, between about 0.5% to 1.5% by total weight of dried apples, and between about 0.75% to 2% by total weight of dried mushrooms.

8. A fly trap, comprising:
   a housing means having an open top, open bottom and a continuous side wall which defines an interior chamber therein adapted to receive and retain entrapped flies;
   a removable cover means for covering the open top of the housing means;
   a frustoconically shaped entry conduit means co-axially mounted within the housing means, said entry conduit means having an open bottom which communicates with exterior of the housing means and an open top which communicates with the interior chamber;
   means for mounting said entry conduit means within said housing in a substantially co-axial relationship therewith;
   a plurality of J-shaped leg support means for supporting the housing and the entry conduit means a distance above a reference horizontal surface;
   a bait holding means supported by the leg support means below the open bottom of the housing means; and
   means for supporting the housing means to the leg support means, wherein said means for securing said housing means to the leg support means comprises an upper horizontal annular member provided with downwardly extending transverse flange, said transverse flange having an exterior surface which is fixedly secured to an inner wall of the housing adjacent an upper part thereof, said upper horizontal annular member extending outwardly and engaging the leg support means.

9. A fly trap, comprising:
   a housing means having an open top, open bottom and a continuous side wall which defines an interior chamber therein adapted to receive and retain entrapped flies;

a removable cover means for covering the open top of the housing means;

a frustoconically shaped entry conduit means co-axially mounted within the housing means, said entry conduit means having an open bottom which communicates with exterior of the housing means and an open top which communicates with the interior chamber;

means for mounting said entry conduit means within said housing in a substantially co-axial relationship therewith;

a plurality of J-shaped leg support means for supporting the housing and the entry conduit means a distance above a reference horizontal surface;

a bait holding means supported by the leg support means below the open bottom of the housing means; and wherein said leg support means comprises a plurality of elongated plates, each plate having a U-shaped groove formed in the central portion thereof and extending through substantially entire length of the plate, said plates extending in a parallel relationship to a longitudinal vertical axis of the housing means, a plurality of J-shaped legs, each leg having a first vertical portion which is engaged in the groove of a corresponding plate, a horizontal middle portion, which is adapted to rest on a horizontal surface, and a second vertical portion extending upwardly from the middle portion to a position underneath the housing means.

10. The device of claim 9, wherein said bait holding means is attached to the second versicle portion of the leg.

11. A fly trap, comprising:

a housing means having an open top, open bottom and a continuous side wall which defines an interior chamber therein adapted to receive and retain entrapped flies;

a removable cover means for covering the open top of the housing means;

a frustoconically shaped entry conduit means co-axially mounted within the housing means, said entry conduit means having an open bottom which communicates with exterior of the housing means and an open top which communicates with the interior chamber;

means for mounting said entry conduit means within said housing in a substantially co-axial relationship therewith;

a plurality of J-shaped leg support means for supporting the housing and the entry conduit means a distance above a reference horizontal surface;

a bait holding means supported by the leg support means below the open bottom of the housing means; and wherein said bait holding means receives a fly bait composition, comprising:

a mixture of between 4% to 6% by total weight of calcium phosphate, between about 13% to 17% by total weight of sodium bicarbonate, between 9% to 11% by total weight of dried bananas, between 40% to 60% by total weight of urea, between 4% to 6% by total weight by total weight of dried animal blood, between 0.25% to 1% by total weight of dry yeast, between 6% to 8% by total weight of fish meal, between 1% to 3% by total weight of potassium, between 1% to 3% by total weight of nitrate, between 0.5% to 1.5% by total weight of dried orange rind, between 0.5% to 1.5% by total weight of dried apples, and between 0.75% to 2% by total weight of dried mushrooms.

12. A composition of matter suitable for use as a fly attracting agent, comprising:

a mixture of between 4% to 6% by total weight of calcium phosphate, between about 13% to 17% by total weight of sodium bicarbonate, between 9% to 11% by total weight of dried bananas, between 40% to 60% by total weight of urea, between 4% to 6% by total weight by total weight of dried animal blood, between 0.25% to 1% by total weight of dry yeast, between 6% to 8% by total weight of fish meal, between 1% to 3% by total weight of potassium, between 1% to 3% by total weight of nitrate, between 0.5% to 1.5% by total weight of dried orange rind, between 0.5% to 1.5% by total weight of dried apples, and between 0.75% to 2% by total weight of dried mushrooms.

13. A fly lure, comprising:

calcium phosphate, sodium bicarbonate, dried bananas, urea, dried animal blood, dry yeast, fish meal, potassium, nitrate, dried orange rind, dried apples, and dried mushrooms mixed in a dry form and then diluted with water to form a viscous substance.

14. The lure of claim 13, wherein the composition contains at least 4% by total weight of calcium phosphate.

15. The composition of claim 13, wherein the composition contains at least 13% by total weight of sodium bicarbonate.

16. The composition of claim 13, wherein the composition contains at least 9% by total weight of dried bananas.

17. The composition of claim 13, wherein the composition contains at least 40% by total weight of urea.

18. The composition of claim 13, wherein the composition contains at least 4% by total weight of dried animal blood.

19. The composition of claim 13, wherein the composition contains at least 0.25% by total weight of dry yeast.

20. The composition of claim 13, wherein the composition contains at least 6% by total weight of fish meal.

21. The composition of claim 13, wherein the composition contains at least 1% by total weight of potassium.

22. The composition of claim 13, wherein the composition contains at least 1% by total weight of nitrate.

23. The composition of claim 13, wherein the composition contains at least 0.5% by total weight of dried orange rind.

24. The composition of claim 13, wherein the composition contains at least 0.5% by total weight of dried apples.

25. The composition of claim 13, wherein the composition contains at least 0.75% by total weight of dried mushrooms.

26. A fly lure, comprising:

a mixture of calcium phosphate, from about 4% to 6% by total weight;

sodium bicarbonate, from about 13% to 17% by total weight;

dried bananas, from about 9% to 11% by total weight;

urea, from about 40% to 60% by total weight;

dried animal blood, from about 4% to 6% by total weight;

dry yeast, from about 0.25% to 1% by total weight;

fish meal from about 6% to 8% by total weight;

potassium and nitrate in equal amounts, from 1% to 3% by total weight;

dried orange rind and dried apples in equal amounts, from about 0.5% to 1.5% by total weight; and dried mushrooms, from about 0.75% to 2% by total weight.

27. A method of attracting flies for subsequent entrapment, which comprises the step of mixing a dry bait mixture with water to form a viscous composition, the dry bait mixture comprising:

from 4% to 6% by total weight of calcium phosphate, from 13% to 17% by total weight of sodium bicarbonate, from 9% to 11% by total weight of dried bananas, from 40% to 60% by total weight of urea, from 4% to 6% by total weight of dried animal blood, from 0.25% to 1% by total weight of dry yeast, from 6% to 8% by total weight of fish meal, from 1% to 3% by total weight of potassium, from 1% to 3% by total weight of nitrate, from 0.5% to 1.5% by total weight of dried orange rind, from 0.5% to 1.5% by total weight of dried apples, and from 0.75% to 2% by total weight of dried mushrooms.

* * * * *